July 4, 1950          A. E. LINDNER          2,513,657

PULLEY

Filed July 10, 1946

INVENTOR,
Arthur E. Lindner,
BY
John W. Stewart.
ATTORNEY

Patented July 4, 1950

2,513,657

UNITED STATES PATENT OFFICE 2,513,657

PULLEY

Arthur E. Lindner, Rutherford, N. J.

Application July 10, 1946, Serial No. 682,692

6 Claims. (Cl. 74—230.5)

This invention relates to belt-and-pulley transmissions. Such transmissions are frequently variable as to the number of belts employed simultaneously and in that case each or at least one of the pulleys involved must be formed with belt-grooves sufficient in number to accommodate the maximum number of belts required, as, for instance, where increased power is to be transmitted and the belts already in use are insufficient for that purpose. In such case, whenever the transmission is to include less than the maximum number of belts, it may be that the portion of the pulley which is not belt-engaged constitutes additional and hence unnecessary load or encumbrance. Again in the case of transmissions in which any belt is of the V-belt type, or V-shaped in cross-section, with the corresponding groove of the pulley also V-shaped, the belt in cross-section may for some reason not engage with the groove at the proper pitch-line as by being unduly thick so that it is engaged at too little depth or unduly thin so that it is engaged at too great depth, either of which conditions may be due to faulty selection or to wear of the belt.

According to this invention I have devised a pulley which, generally stated, involves the following features: It is composed in a novel way of sections, being divided crosswise of its axis, so that it may provide a given number or some less number of belt-receiving grooves and when it provides any less number so much thereof as includes a groove or grooves not in use may be detached. When the pulley is designed to accommodate V-belts, assuming the pulley to include what I term a sheave having a fixed peripheral pitch-ring and a cylindrical perimeter at the beveled or inclined side thereof, I position another and removable pitch-ring on and closely fitting said perimeter and with a beveled side thereof facing the first pitch-ring and between the two such pitch-rings and also closely fitting said perimeter I position a removable spacer ring, the latter being preferably formed of cross-sectionally circular metal wire and having the gage required to insure that a given belt will be engaged with the corresponding pulley groove at the intended depth. Assume the pulley is constructed as above indicated, including a sheave having a fixed peripheral pitch-ring and a cylindrical perimeter at the bevelled side of the latter but also including, merely for the purpose of example, only one removable pitch-ring fitting said perimeter; if the belt does not engage the pulley groove in coincidence with the pitch-line a spacer ring of the proper thickness or gage may be interposed between the pitch-rings to accomplish the purpose. Of course, if there is a plurality of pitch-rings and any one belt fails to engage its groove at the pitch-line this condition may be corrected as to such groove without affecting the assumed proper engagement of any other belt in its groove.

Describing that example of a pulley embodying invention which is shown in the accompanying drawing but by which I am of course not limited, in such drawing, Fig. 1 shows the pulley of this invention mainly in diametric section;

Figure 1:
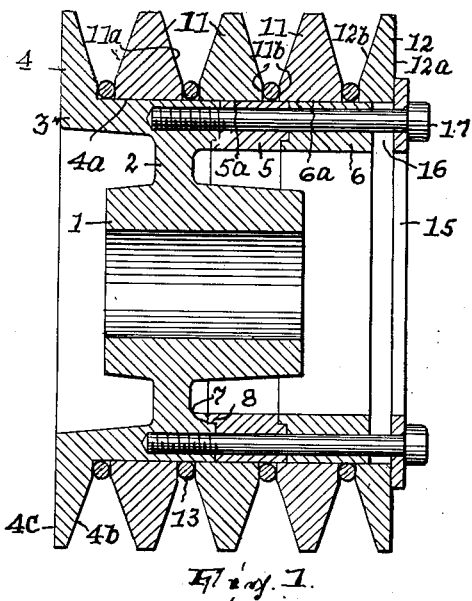
Figure 2:
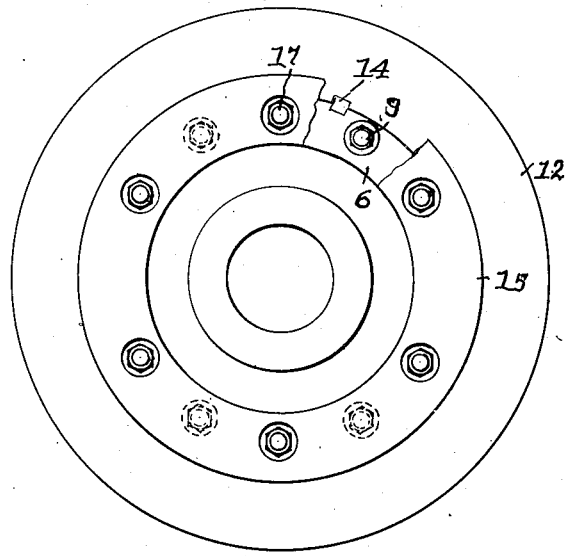
Fig. 2 is a right side elevation thereof, partly broken away.

The body part of the pulley includes in the present example a hub 1, a web 2 surrounding the hub, a cylindrical rim 3 surrounding the web and a peripheral flange 4 surrounding the rim, these parts here forming an integral structure. However, what the form of the body part is is not material so long as it is in some way adapted to be supported (as by the mentioned hub) for rotation around its axis and has the said flange and a perimeter 4a flanking the flange.

Flanking that end face of the body part to which said perimeter extends from the flange is a member 5 having a cylindrical perimeter 5a which is flush with the perimeter 4a. Flanking that end face of member 5 which is remote from flange 4 is another member 6 having a cylindrical perimeter 6a which is flush with perimeter 5a. The members 5 and 6 are here annular or rings, so that they may assume abutting relation to each other shown by Fig. 1 notwithstanding the body part has an axial projection here formed by that portion of the hub which is at the right of web 2 in the present example. Thus a sheave is formed by the body portion and members 5 and 6 having a cylindrical perimeter (being a composite of the perimeters of the body portion and said rings) and a projecting peripheral flange 4 lateral thereof.

The assembly or sheave as so far formed is to have its component parts held rigidly together both against radial and axial displacement. To prevent the radial displacement in any direction they are telescoped together, here by the body portion and ring 5 each having a rabbet 7 and each ring having a rib 8 engaged in the adjoining rabbet, the rabbets and ribs being endless. Said parts of the sheave are confined against axial displacement by screws, as 9, which, at suitable intervals around the axis of the pulley, extend freely through the rings 5—6 but are tapped into said body part, their heads being preferably countersunk into ring 6 so as not to protrude therefrom.

In addition to the flange 4 forming a fixed part of the sheave, other and removable flanges are to be assembled with the sheave, as those shown at 11 and the one at 12. The side faces 11a of each flange 11 are beveled, both at the same angle except preferably at 11b, at their inner margins where such side face are in planes perpendicular to the axis of the pulley. The flange 12 has one side face 12a in a plane perpendicular to said axis and its other side face 12b identical in form to the side face of any flange. Flange 4 as for its faces 4b and 4c is a reverse counterpart of the flange 12. Specifically, due to the converging of the side faces of any two flanges toward the pulley axis, I term such flanges "pitch-rings."

Between and alternating with the pitch-rings are removable metal (as steel wire) cross-sectionally circular spacer rings 13; these may vary in gage.

Preferably each of the flanges 11 and 12 is splined to the sheave, as at 14.

The group of parts 11, 12 and 13 shown assembled with the sheave are here confined against displacement from the flange (or pitch-ring) 4 by the following means: The overall length of said group exceeds that of the perimeter 4a of the sheave, so that said group projects beyond the right-hand end of the sheave. A planiform clamping ring 15 abuts part 12 with clearance at 16 between the ring and said end of sheave, which latter it opposes. At suitable intervals around the sheave axis this ring is held to the sheave (subjecting said group of parts to compression by and between said ring and flange 4) by screws 17 screwed into the sheave, their heads abutting the outer face of the ring.

The construction of the pulley according to the present example is such that it can be used as it stands, or as shown, accommodating here four belts simultaneously or, by removing one or both of the sheave sections 5 and 6 and one or more of the removable flanges used accommodating three or two belts. The widths and number of the sections and flanges as here shown are of course not material. As indicated, any spacer ring may be exchanged for another of different thickness or gage if the belt engaged in the corresponding groove fails to obtain therein the proper traction effort.

Figure 3:
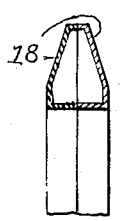
Fig. 3 is a fragmentary section of a modified form of a pitch-ring.

The modified form of pitch-ring shown in Fig. 3 has the same contour in diametric section as a pitch-ring 11 but is formed of two reverse counterpart sections 18 each channeled continuously thereof at its inner side, so that it is in the form of a stamping.

Having thus fully described my invention what I claim is:

1. In a pulley, the combination, with a sheave comprising side-by-side coaxial sections of the same diameter and together providing the sheave with a cylindrical perimeter and one such section having lateral of and of greater diameter than and confined against lateral displacement from said perimeter an annular flange, means releasably binding said sections together, annular means forming with said flange a peripheral groove of the pulley and surrounding and closely fitting said perimeter and removable therefrom laterally of the flange, and means anchored to the sheave at intervals around the axis thereof and releasably confining said annular means to the sheave and against displacement from said flange.

2. The combination set forth in claim 1 characterized by said sections having telescopic portions confining them against relative displacement in any radial direction.

3. The combination set forth in claim 1 characterized by said sheave and annular means being splined together.

4. A multiple V-belt receiving pulley comprising a sheave and a hub connected thereto, the sheave comprising a main sheave body having a flange at the forward end thereof, the rear face of the flange being beveled to contact one face of a V-belt, the remainder of the periphery of the sheave main body being cylindrical, the hub being connected to the sheave main body, the sheave including at least one separable section having a cylindrical periphery of the same diameter as the sheave main body, the main body and the separable section abutting at the rear end of the sheave main body along a surface generally transverse to the axis of the sheave, means to maintain the main body and the separable section in axial alignment, a plurality of separable pitch-rings slidably received on the peripheral surfaces of the sheave main body and the separable sheave section, a spacer ring snugly fitting about the sheave located between each pair of adjacent pitch-rings and between the flange on the sheave main body and the pitch-ring adjacent such flange, the pitch-rings consisting of at least one intermediate pitch-ring and an end pitch-ring, both sides of the intermediate pitch-rings being beveled to contact a side of a V-belt and the forward face of the end pitch-ring being so beveled, the rear end of the end pitch-ring extending rearwardly of the rear end of the separable sheave section, and means for holding the main sheave body and the separable section together and for holding the intermediate and end pitch-rings and separator rings all in tight contact.

5. A multiple V-belt receiving pulley comprising a sheave and a hub connected thereto, the sheave comprising a main sheave body having a flange at the forward end thereof, the rear face of the flange being beveled to contact one face of a V-belt, the remainder of the periphery of the sheave main body being cylindrical, the hub being connected to the sheave main body, the sheave including at least one separable section having a cylindrical periphery of the same diameter as the sheave main body, the main body and the separable section abutting at the rear end of the sheave main body along a surface generally transverse to the axis of the sheave, means to maintain the main body and the separable section in axial alignment, a plurality of separable pitch-rings slidably received on the peripheral surfaces of the sheave main body and the separable sheave section, a spacer ring snugly fitting about the sheave located between each pair of adjacent pitch-rings and between the flange on the sheave main body and the pitch-ring adjacent such flange, the pitch-rings consisting of at least one intermediate pitch-ring and an end pitch-ring, both sides of the intermediate pitch-rings being beveled to contact a side of a V-belt and the forward face of the end pitch-ring being so beveled, the rear end of the end pitch-ring extending rearwardly of the rear end of the separable sheave section, and means for holding the main sheave body and the separable section together and for holding the intermediate and end pitch-rings and separator rings all in tight contact, said last named means comprising a plurality of elongated fastening members having their forward ends attached to the sheave main body and extending parallel to the axis of the sheave and angularly spaced thereabout, the fastening members extending through bores in the separable sheave section, a retaining ring transverse to the axis of the sheave engaging the rear surface of the end pitch-ring, the fastening members extending through the retaining ring and holding it in place.

6. A multiple V-belt receiving pulley comprising a sheave and a hub connected thereto, the sheave comprising a main sheave body having a flange at the forward end thereof, the rear face of the flange being beveled to contact one face of a V-belt, the remainder of the periphery of the sheave main body being cylindrical, the hub being connected to the sheave main body, the sheave including at least one separable section having a cylindrical periphery of the same diameter as the sheave main body, the main body and the separable section having telescoping engagement at the rear end of the sheave main body to hold them in alignment, a portion of the abutting surfaces of each such part lying generally transverse to the axis of the sheave, a plurality of separable pitch-rings slidably received on the peripheral surfaces of the sheave main body and the separable sheave section, a spacer ring snugly fitting about the sheave located between each pair of adjacent pitch-rings and between the flange on the sheave main body and the pitch-ring adjacent such flange, the pitch-rings consisting of at least one intermediate pitch-ring and an end pitch-ring, both sides of the intermediate pitch-rings being beveled to contact a side of a V-belt and the forward face of the end pitch-ring being so beveled, the rear end of the end pitch-ring extending rearwardly of the rear end of the separable sheave section, and means for holding the main sheave body and the separable section together and for holding the intermediate and end pitch-rings and separator rings all in tight contact, said last named means comprising a plurality of bolts having their forward ends screwed into the sheave main body and extending parallel to the axis of the sheave and angularly spaced thereabout, the bolts extending through bores in the separable sheave section, a retaining ring transverse to the axis of the sheave engaging the rear surface of the end pitch-ring, the bolts extending through the retaining ring and holding it in place.

ARTHUR E. LINDNER.

REFERENCES CITED

The following references are of record in the file of this patent:

UNITED STATES PATENTS

| Number | Name | Date |
| --- | --- | --- |
| 387,024 | Walker | July 31, 1888 |
| 1,031,106 | Camp | July 2, 1912 |
| 1,792,733 | DeWein | Feb. 17, 1931 |
| 1,887,279 | Bendit | Nov. 8, 1932 |
| 1,900,222 | Bowen | Mar. 7, 1933 |
| 2,104,074 | Erbach | Jan. 4, 1938 |